Mar. 27, 1923.

1,449,702

J. B. SIZEMORE

SHOVEL

Filed Sept. 30, 1921

WITNESSES
Guy M. Spring
J. S. McCuthan

JAMES B. SIZEMORE, Inventor

By Richard B. Owen, Attorney

Patented Mar. 27, 1923.

1,449,702

UNITED STATES PATENT OFFICE.

JAMES B. SIZEMORE, OF CANEBRAKE, WEST VIRGINIA.

SHOVEL.

Application filed September 30, 1921. Serial No. 504,327.

*To all whom it may concern:*

Be it known that I, JAMES B. SIZEMORE, citizen of the United States, residing at Canebrake, in the county of McDowell and State of West Virginia, have invented certain new and useful Improvements in Shovels, of which the following is a specification.

This invention relates to shovels, and has for its object the production of a simple and efficient brace for a shovel, which will facilitate the balancing of the shovel, while in use.

Another object of the invention is the production of a brace for a shovel, which will permit the shovel to be more easily lifted with a heavier load, than is possible with the ordinary shovel.

Other objects and advantages of the present invention, will appear throughout the following specification and claims.

Figure 1:
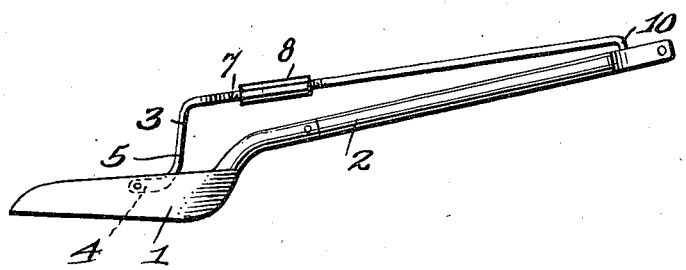
Figure 1 is a side elevation of the shovel showing the brace attached thereto.
Figure 2:
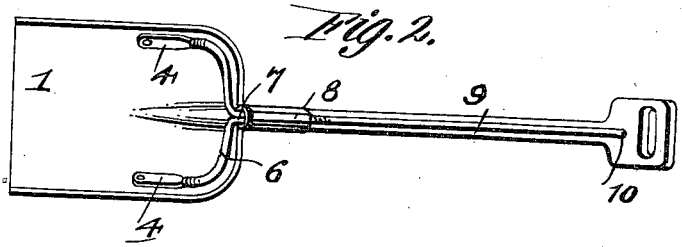
Figure 2 is a top plan view of the shovel showing the brace attached thereto.

By referring to the drawings, it will be seen that 1 designates the body of the shovel, which is provided with the ordinary handle 2. A pair of bracing rods 3, have their lower ends 4 riveted or otherwise secured to the body of the shovel, and have their upstanding portions 5 terminating in inwardly extending portions 6, these inwardly extending portions 6 terminating in rearwardly extending ends 7. These ends 7 are threaded, and receive the threaded turnbuckle 8, this turn buckle 8 being also threaded upon the inner end of the brace rod 9. The brace rod 9 has a downwardly turned end 10 which is embedded in the upper end of the handle 2 as shown in the drawing.

From the foregoing description, it will be seen that a very simple bracing means has been produced for a shovel, and that the bracing means may be adjusted to strengthen the shovel, and maintain the body or blade of the shovel in a correct position with respect to the handle thereof. It will be seen, by considering the drawings, that the ends 4 of the bracing rods 3, engage the body or blade of the shovel near the center thereof and near the side edges, thereby efficiently bracing the blade intermediate the ends thereof.

As shown in the drawings, the brace extends above the shovel a considerable distance above the handle, and at an angle to the longitudinal axis thereof, in this way producing an efficient brace. The bracing rods 3 are so constructed as to be out of the way of the material lifted by the shovel, in view of the fact that the rods 3 are secured to the shovel near the side edges and are bent to conform to the contour of the rear end of the shovel blade.

What is claimed is:

1. A device of the class described comprising a shovel blade, a handle, a plurality of diverging bracing rods provided with forwardly extending ends secured to said shovel blade, said bracing rods provided with upstanding portions, said upstanding portions provided with rearwardly extending ends, an elongated bracing rod, a turnbuckle connecting said elongated bracing rod with the rearwardly extending ends of said first mentioned bracing rods, and said elongated bracing rod provided with an inturned end engaging the upper end of said handle for securing the last mentioned bracing rods thereto.

2. A shovel brace mechanism comprising a shovel blade, a handle, a plurality of bracing rods secured to the sides of said shovel blades, a second bracing rod secured to the handle, and adjusting means interposed between the first and last mentioned bracing rods.

In testimony whereof he affixes his signature in presence of two witnesses.

JAMES B. SIZEMORE.

Witnesses:
J. H. ASBURY,
ARCHIE J. PRUETT.